May 6, 1969          G. F. ALBERS          3,442,641
METALLIC BRAZING MIXTURE
Filed March 4, 1965
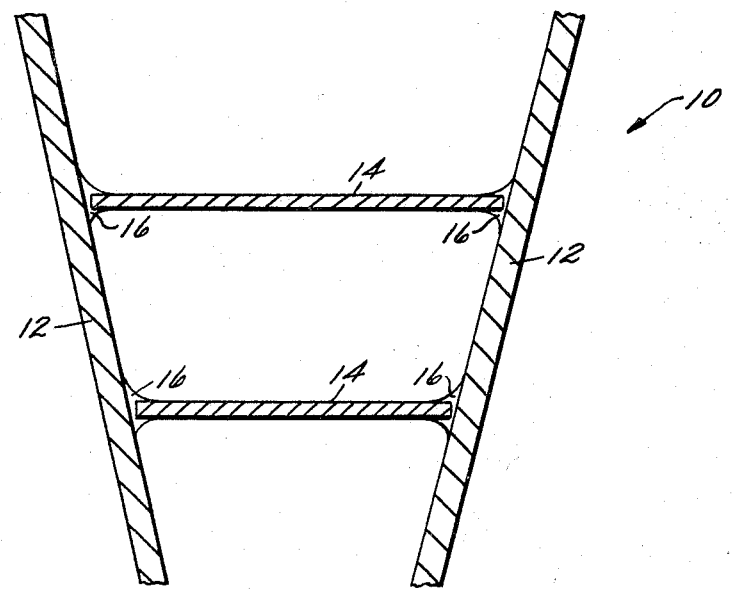
INVENTOR.
GEORGE F. ALBERS
BY
ATTORNEY

United States Patent Office 3,442,641
Patented May 6, 1969

3,442,641
METALLIC BRAZING MIXTURE
George F. Albers, West Chester, Ohio, assignor to General Electric Company, a corporation of New York
Filed Mar. 4, 1965, Ser. No. 437,041
Int. Cl. C22b 53/00
U.S. Cl. 75—.5                                      3 Claims

ABSTRACT OF THE DISCLOSURE

A brazing mixture for use across a relatively wide gap in joining members based on the element titanium consists essentially of two powdered metallic materials. One material is powdered titanium. The other material is a powdered metallic material which acts as a liquid phase binder and preferably is silver or silver with a small amount of aluminum.

---

This invention relates to the field of brazing materials and methods. More particularly, it relates to a brazing powder mixture especially useful in brazing a wide gap juncture between members of an article.

The need for a brazing alloy or mixture having the ability to bridge relatively wide gaps, for example, up to 0.1" or greater, arose in connection with the manufacture of high temperature operating power producing apparatus, such as gas turbines. In such apparatus, advance high temperature operating and difficult to work superalloys were used.

It was recognized that reduced costs could be attained in manufacturing including brazing where allowable tolerances could be spread at junctions to be welded. The cost of making each part of a lower tolerance could be reduced. Therefore, a number of high temperature brazing alloys or mixtures were developed and have been reported. Such alloys and mixtures are particularly useful with the higher temperature operating iron, nickel or cobalt base superalloys, the brazing alloys being based primarily on such elements. However, in studying such wide gap brazing materials in connection with the problems associated with the manufacture of articles of titanium and its alloys, it was found that the known wide gap brazing alloys and mixtures had undesirable characteristics including such metallurgical reactions as erosion and diffusion as well as too high a brazing temperature requirement. Because known materials could not be used, it was necessary prior to this invention to place a boot at the juncture and braze the boot to each member to be joined.

Therefore it is a principal object of this invention to provide an improved wide gap brazing material for use with an improved brazing method which can bridge relatively wide gaps in such intermediate temperature materials as titanium or its alloys particularly useful in brazing relatively wide gaps at junctures between members.

A more specific object is to provide an improved method for joining members of titanium or its alloys across a relatively wide gap.

Still another object is to provide an improved structure including members soundly brazed at a juncture with an improved brazing material.

These and other objects and advantages will be more readily recognized from the drawing and the following detailed description and examples which are not meant to limit the scope of the present invention.

The drawing is a fragmentary, sectional view of a vane and baffle assembly joined by the method and mixture of the present invention.

Briefly, the wide gap brazing mixture of the present invention, as it relates to titanium, is an intimate powder mixture consisting essentially of, by weight, 60% to less than 95% titanium powder mixed with more than 5% to 40% of a compatible powdered metallic liquid phase binder. The metallic liquid phase binder can, for example, consist essentially of up to 5 weight percent aluminum with the balance silver.

The method aspect of the present invention broadly involves the brazing along a juncture of two members each of an alloy based on a specified metallic element, for example titanium. A first slurry of a mixture of powders and a non-metallic binder is placed along the juncture. The mixture of powders comprises from 60% to less than 95% by weight of a powder of the specified element and more than 5 to 40 weight percent of a compatible metallic, for example silver or 5% Al-Ag liquid phase binder. Completing the first slurry is a non-metallic binder which will decompose upon heating without leaving a carbonaceous residue. After placement of such a first slurry at the juncture, the slurry is solidified such as by air drying or sintering, after which a second slurry is placed over the solidified first slurry. The second slurry consists essentially of a powdered metallic liquid phase binder, compatible with the mixture of powders of the first slurry and which has a melting point less than the specified metallic element of the member and of the mixture of powders of the first slurry. Completing the second slurry is a non-metallic binder which will decompose upon heating without leaving a carbonaceous residue.

Thus the method of the present invention involves the application of two metal powder slurries successively at the juncture between members to be brazed. The practice of the method of the present invention of applying a second slurry to a solidified first slurry prior to brazing can depend partially upon the selected composition range of metallic powders included in the first and second slurries and whether or not the first slurry is allowed to solidify merely by air drying or by sintering. These aspects of the present invention will be more clearly understood from discussion of the following tables and specific examples.

In order to more fully evaluate the various aspects of the present invention, a series of pairs of A–110 titanium alloy "T"-samples were prepared and brazed with gaps at the juncture between members of the "T" varying from 0.050" to 0.250". The nominal composition of the A–110 titanium alloy members was, by weight 5% Al, 2.5% Sn, 0.3% Mn, 0.5% Fe with the balance essentially Ti. In the tests shown in the tables and examples, the powdered mixture of the first slurry applied to the juncture between the two titanium alloy members was based on the element titanium and had a melting point lower than that of Ti. In the tables, this powdered mixture was referred to as "base fillet powder mixture."

The powdered metallic mixture of the second slurry was compatible with and had a melting point lower than the powdered metallic mixture of the first slurry. Thus it functioned as an additional liquid phase binder when melted in contact with powders of the first mixture at a temperature lower than the predominant powdered element, Ti in the examples. The powder of the second slurry, referred to in the tables as an "overlay," was based, in the examples shown, on the element silver.

Example 1 base fillet composition shown in the following Table I was 100 weight percent titanium powder. The base fillet composition of Examples 2 through 14 contained from 60–95 weight percent titanium with the balance a compatible metallic liquid phase binder of either silver or an alloy of 5 weight percent aluminum-95 weight percent silver. The powdered mixture of the second, or overlay slurry applied to the solidified first slurry in Examples 1 through 14 was powdered silver referred to in the Tables I and II as "Ag overlay." The first and second slurries of powders were made fluid by adding a sufficient amount of a non-metallic liquid binder which had the characteristic of decomposing when heated without leaving a carbonaceous residue. In all of the examples shown in the present application, the slurries were made by adding approximately equal parts of powdered metallic mixture and the non-metallic liquid binder in the form of an acrylic resin dissolved in toluene. It will be understood, however, that more or less of the non-metallic liquid binder can be used depending on the initial fluidity, paste-like consistency, etc., desired. Although the size of the powders in the mixture are not especially critical, in the following examples, the powders used were −200 +325 mesh. In order to mix the powders thoroughly, they were placed in a conical blender for 30 minutes.

In Examples 1 through 6 of the following Table I, the first slurry was applied to the juncture between the structural titanium base alloy members and allowed to air dry, for example, for about 1½ hours minimum. After drying, the second slurry including the silver powder was overlaid at approximately equal volumes with the first slurry and allowed to air dry. The titanium base alloy members having the composite or two part joint at a juncture to be brazed were heated in a vacuum furnace at a pressure of about 0.5 micron and a temperature of about 1770° F. to braze the base and overlay portions of the joint. After cooling to about 200° F. or below, the brazed members were removed from the furnace and observed. The finished condition is that shown in the following Table I for each of the powdered mixtures tested.

TABLE I

[Base not presintered—Ag overlay, base and overlay brazed at 1,770° F.]

| Example | Base fillet powder mixture (wt. percent) | | Finished condition |
|---|---|---|---|
| | Ti | Other powder | |
| 1 | 100 | | Porous. |
| 2 | 95 | 5 (Ag) | Do. |
| 3 | 90 | 10 (Ag) | Good. |
| 4 | 60 | 40 (Ag) | Do. |
| 5 | 90 | 10 (95 Ag, 5 Al) | Poor. |
| 6 | 75 | 25 (95 Ag, 5 Al) | Do. |

In another series of tests of which Examples 7 through 14 of the following Table II are representative, the first slurry was applied to the juncture between the structural titanium base alloys and allowed to air dry as were Examples 1 through 6. However, after drying, and before applying the second or overlay slurry, the first slurry was presintered in a vacuum as before at a temperature of between 1600–1800° F. as shown in Table II. After cooling the members and removing them from the furnace, the second slurry including the silver powder was placed over the presintered first slurry powder mixture at approximately an equal volume as the first slurry and allowed to air dry. Then the members, now including the composite or two part joint structure with the first part having been presintered, were heated in vacuum as before at a temperature of about 1770° F. to braze the overlay portion and the presintered base portion. After cooling to about 200° F. or below, the brazed members were removed from the furnace and observed. The finished condition of the brazed joint of those examples are shown in the following Table II for each of the powdered mixtures tested.

TABLE II

[Base presintered—Ag overlay, base and overlay brazed at 1,770° F.]

| Example | Base fillet powder mixture (wt. percent) | | Presinter temp. (° F.) | Finished condition |
|---|---|---|---|---|
| | Ti | Other powder | | |
| 7 | 95 | 5 (Ag) | 1,770 | Porous. |
| 8 | 90 | 10 (Ag) | 1,770 | Good. |
| 9 | 75 | 25 (Ag) | 1,770 | Do. |
| 10 | 60 | 40 (Ag) | 1,770 | Do. |
| 11 | 90 | 10 (95 Ag, 5 Al) | 1,770 | Do. |
| 12 | 90 | 10 (95 Ag, 5 Al) | 1,650 | Do. |
| 13 | 75 | 25 (95 Ag, 5 Al) | 1,770 | Do. |
| 14 | 75 | 25 (95 Ag, 5 Al) | 1,650 | Do. |

It is to be noted that both in Table I and Table II, base fillet powder mixtures of 95 weight percent titanium or more resulted in a porous and generally unacceptable brazed joint condition. However, within the range of from about 60 to less than 95 weight percent titanium, with the balance of either silver or a silver alloy including up to 5 weight percent aluminum, a satisfactory brazed joint could be obtained through the practice of the method of the present invention involving presintering the base fillet. However, when the base fillet was not presintered, a satisfactory joint could only be obtained when the powder mixed with the titanium and which functioned as a metallic liquid phase binder, did not include an element other than silver. In the examples of Tables I and II, a silver overlay or second slurry portion was used. Therefore, as was stated before, the practice of the method of the present invention depends unexpectedly on the compositions selected within the composition range of the present invention when the base fillet is solidified merely by air drying rather than by presintering.

The procedure used with Examples 1 through 6 was repeated for first applying an air dried base fillet and then an overly of 95% Ag-5% Al alloy. This was done to observe the effect on the finished joint of other elements in the overlay portion because it has a melting point lower than the Ti of the first slurry and functions as a metallic liquid phase binder for the base fillet portion during brazing. The following Table III gives the results of these tests.

TABLE III

[Base not presintered—95 Ag, 5 Al overlay; base and overlay brazed at 1,650° F.]

| Example | Base fillet powder mixture (wt. percent) | | Finished condition |
|---|---|---|---|
| | Ti | Other powder | |
| 15 | 90 | 10 (Ag) | Good. |
| 16 | 75 | 25 (Ag) | Poor. |
| 17 | 60 | 40 (Ag) | Do. |
| 18 | 90 | 10 (95 Ag, 5 Al) | Do. |
| 19 | 75 | 25 (95 Ag, 5 Al) | Do. |
| 20 | 60 | 40 (95 Ag, 5 Al) | Do. |

It was found through the use of a 5% Al, 95% silver alloy overlay that about 90 weight percent titanium or more of the entire base fillet powder mixture is required if the base fillet is not to be presintered prior to application of the overlay portion. In the examples of the following Table IV, it is to be noted further that as additional elements such as aluminum are introduced either in the base fillet powder mixture or in the overlay portion, the brazing procedure to be used becomes more and more critical with regard to composition and to presintering temperature. In Examples 21–27, the same procedure was followed as with Examples 7–14 wherein the base fillet was presintered at the temperature shown in the table.

TABLE IV

[Base presintered—95Ag, 5Al overlay; base and overlay brazed at 1,650° F.]

| Example | Base fillet powder mixture (wt. percent) | | Presinter temp. (° F.) | Finished condition |
|---|---|---|---|---|
| | Ti | Other powder | | |
| 21 | 90 | 10 (Ag) | 1,770 | Good. |
| 22 | 60 | 40 (Ag) | 1,770 | Do. |
| 23 | 90 | 10 (95 Ag, 5 Al) | 1,770 | Do. |
| 24 | 90 | 10 (95 Ag, 5 Al) | 1,650 | Poor. |
| 25 | 75 | 25 (95 Ag, 5 Al) | 1,770 | Good. |
| 26 | 75 | 25 (95 Ag, 5 Al) | 1,650 | Poor. |
| 27 | 60 | 40 (95 Ag, 5 Al) | 1,770 | Good. |

From these data, it can be seen that it is specifically preferred that the base fillet be presintered in the practice of the method of the present invention prior to final sintering with the overlay although it has been found unexpectedly that in special instances such as in compositions of Examples 3, 4 and 15, merely air drying of the base fillet can be used satisfactorily. However, even with presintering of the base fillet portion, it has been found that there are critical composition areas with which lower temperature limitations exist when the liquid phase binder portion either of the base fillet or of the overlay includes foreign elements. For example, note that Examples 12 and 14 in Table II result in a good braze joint finished condition even though the presintering was conducted at 1650° F. whereas in Examples 24 and 26 with the same presintering temperature of 1650° F., the finished condition of the brazed joint was poor. Thus in the practice of the present invention, the presintering temperature must be adjusted under certain conditions.

EXAMPLE 28

Because Example 15 resulted in a good finished brazed joint but did not require presintering of the base portion and required final brazing at only 1650° F., the test of Example 15 was repeated with a vane and flow plate assembly, portions of which are shown in the drawing. In the drawings, vanes 12 are joined by flow plates 14 through brazed joints 16. Prior to the present invention, it was necessary to place boots at each of the joints 16 and braze the boots to the flow plates and vanes in order to bridge the relatively wide and irregular gaps which existed at those points. The more accurate fitting of the flow plates and vanes together would have required additional and costly manufacturing procedures.

The composition of vane 12 and of plate 14 was, by weight, 5% Al, 2.5% Sn, 0.3% Mn, 0.5% Fe with the balance essentially Ti. After thoroughly cleaning the titanium alloy members to be brazed, a powdered mixture was prepared by blending pure titanium powder of −200 +325 mesh with pure silver powder of the same mesh size in the proportion of 90% Ti-10% Ag by weight. To this mixture powders which were subsequently used as the base fillet mixture was added an equal volume of an acrylic resin dissolved in toluene. After mixing of the powder and the liquid binder, the slurry was applied to the joint between vanes 12 and flow plates 14 at points 16 to form a fillet of a maximum dimension of 0.060". Then the fillet was allowed to air dry.

An overlay slurry was prepared by first mixing a powdered brazing alloy having a composition, by weight, of 5% Al-95% Ag and having a screen analysis of −200 +325 mesh with about an equal volume of acrylic resin and dissolved in toluene. This second or overlay slurry was applied to and at the about same volume as the dried base fillet to form a fillet of 0.085" measured on the leg of a triangle formed by the fillet. The overlay portion was allowed to air dry after which the entire assembly, shown generally at 10 in the drawing, and its holding fixture were placed in a vacuum furnace. At a pressure of 0.5 micron, the assembly was heated to about 1700° F. and held for a maximum of 15 minutes after which it was cooled and gas quenched with argon to about 200° F. before removing from the furnace. The resulting brazed joints were excellent and had a good surface finish condition.

Because the powders of the base and overlay portions were about equal in volume, the finished brazed joints had a composition, by weight, of about 20–30% Ti, up to about 3% Al with the balance Ag. This is shown for some selected examples in the following Table V.

TABLE V

[Data on powders and brazed joints, composition at 50 vol. percent each of base and overlay]

| Base | | Overlay | | Density | Wt. percent of brazed joint | | |
|---|---|---|---|---|---|---|---|
| Ti | Other | Ag | Al | | Ti | Ag | Al |
| 100 | | | | 4.50 | | | |
| 95 | 5 Ag | | | 4.62 | | | |
| 90 | 5 Ag | | | 4.77 | | | |
| 90 | 10 (95 Ag, 5 Al) | | | 4.74 | | | |
| | | 100 | | 10.5 | | | |
| | | 95 | 5 | 9.17 | | | |
| 95 | 5 Ag | 100 | | | 29 | 71 | |
| 90 | 10 Ag | 100 | | | 28 | 72 | |
| 90 | 10 Ag | 95 | 5 | | 31 | 66 | 3 |
| 60 | 40 Ag | 100 | | | 21 | 79 | |
| 60 | 40 Ag | 95 | 5 | | 23 | 74 | 3 |

Although the present invention has been described in connection with certain specific examples, it will be recognized by those skilled in the art the modifications and variations of which this invention is capable.

What is claimed is:

1. A wide gap brazing mixture of metallic powders particularly useful for joining members based on the element titanium, consisting essentially of an intimate mixture, by weight, of
   60% to less than 95% Ti powder; and
   more than 5% and up to 40% of a powdered alloy consisting essentially of up to 5 weight percent aluminum with the balance silver.

2. A wide gap brazing mixture of metallic powders particularly useful for joining members based on the element titanium, consisting essentially of an intimate mixture, by weight, of
   60–90% Ti powder; and
   10–40% of a powdered alloy consisting essentially of about 5 weight percent aluminum with the balance silver.

3. A wide gap brazing mixture of metallic powders particularly useful for joining members based on the element titanium, consisting essentially of an intimate mixture, by weight, of
   90% Ti powder; and
   10% of a powdered alloy consisting essentially of about 5 weight percent aluminum with the balance silver.

References Cited

UNITED STATES PATENTS

| 1,025,426 | 5/1912 | Rossi | 75—27 X |
| 2,674,542 | 4/1954 | Alexander. | |
| 2,750,271 | 6/1956 | Cueilleron et al. | 75—.55 X |
| 2,810,642 | 10/1957 | Jaffee | 75—175.5 |
| 2,822,269 | 2/1958 | Long | 75—175.5 |
| 3,006,757 | 10/1961 | Hoppin | 75—161 X |
| 3,073,269 | 1/1963 | Hoppin | 29—504 X |
| 3,155,491 | 11/1964 | Hoppin | 75—.5 |
| 3,220,808 | 11/1965 | Davies | 29—504 X |
| 3,259,971 | 7/1966 | Gagola | 228—56 X |
| 3,309,767 | 3/1967 | Sama | 29—504 X |

FOREIGN PATENTS

| 647,412 | 8/1962 | Canada. |
| 785,293 | 10/1957 | Great Britain. |

(Other references on following page)

OTHER REFERENCES

Air Force Technical Report 6218, part 2, June 1950, Research and Development on Ti Alloys, Batelle Memorial Institute.

The Tentative Titanium-Silver Binary System, Wright Air Development Center Report 53-109, part I, Adenstedt and Freeman, April 1953.

Constitution of Binary Alloys, Hansen, McGraw-Hill, Metallurgy, series, 1958, p. 59.

Treatise on Powder Metallurgy. vol. II by Claus Goetzel, pp. 698 through 705, copyright 1950, published by Interscience Publishers Incorporated.

JOHN F. CAMPBELL, *Primary Examiner.*

R. F. DROPKIN, *Assistant Examiner.*

U.S. Cl. X.R.

29—198, 497, 500, 504; 75—175.5; 228—56